Oct. 13, 1964          W. D. CALDWELL          3,153,193
ELECTRICAL MEASURING INSTRUMENT WITH DIGITAL INDICATION
Filed Feb. 14, 1955          5 Sheets-Sheet 3
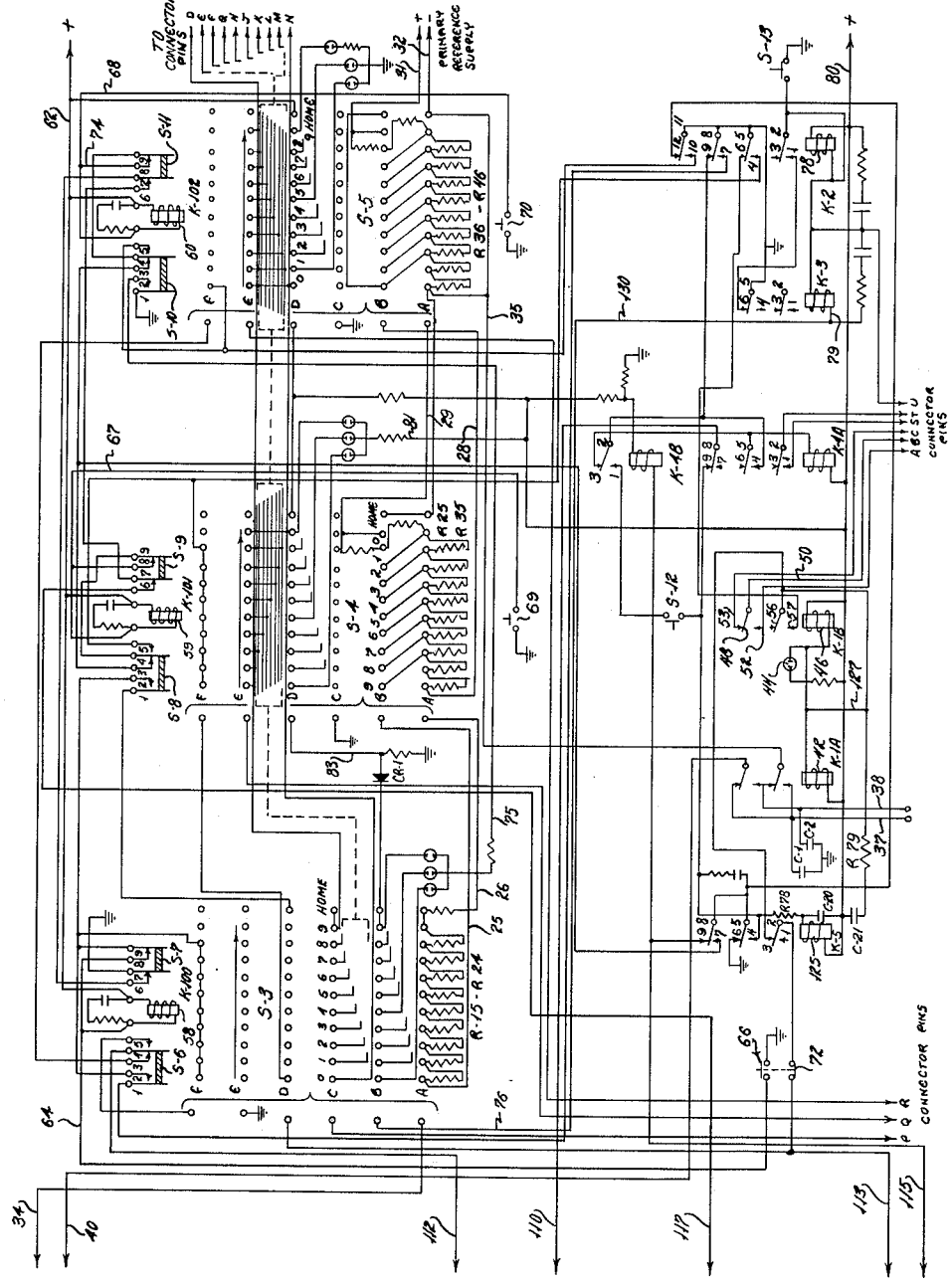
INVENTOR
Wyche D. Caldwell
BY Strauch, Nolan & Diggins
ATTORNEYS

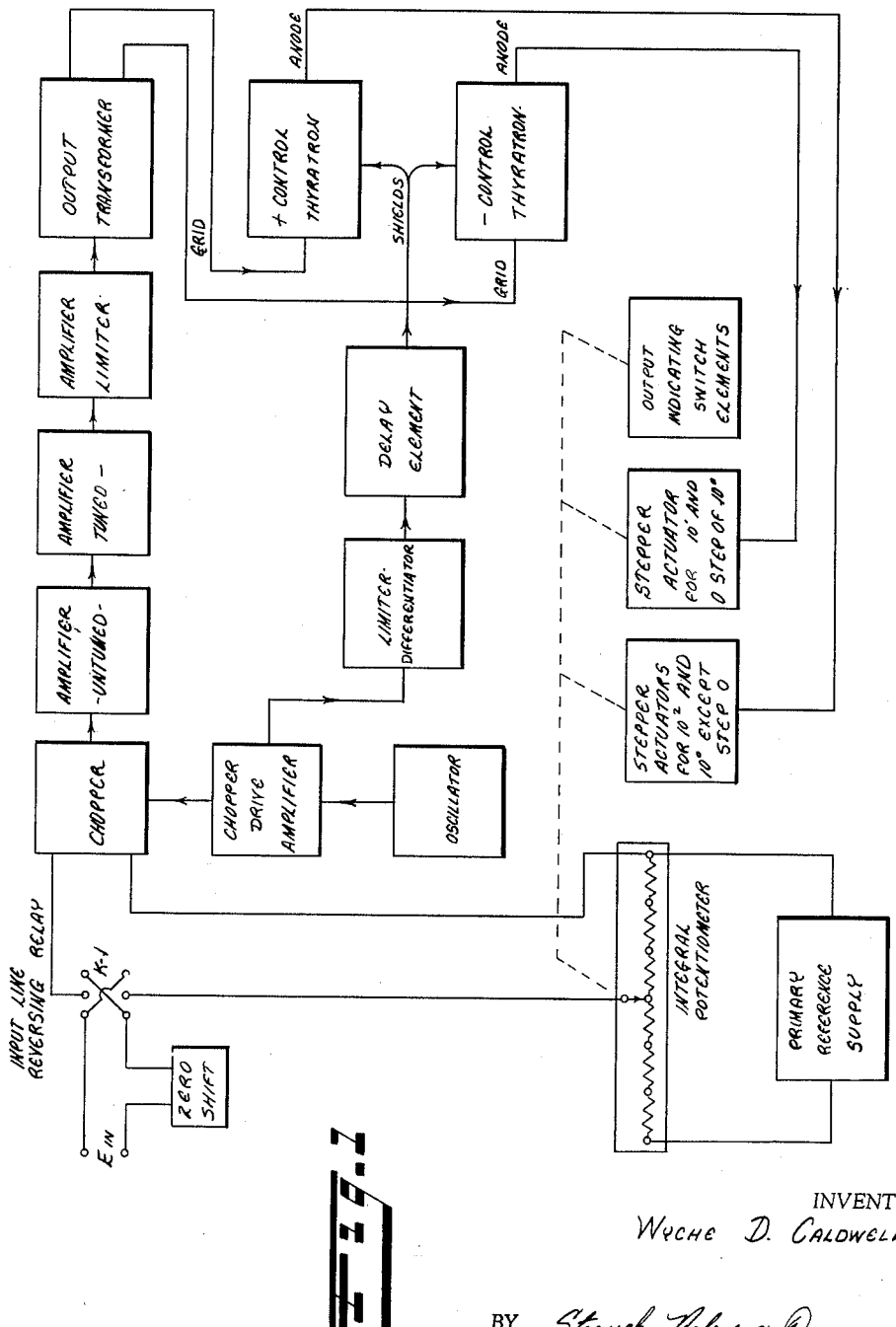

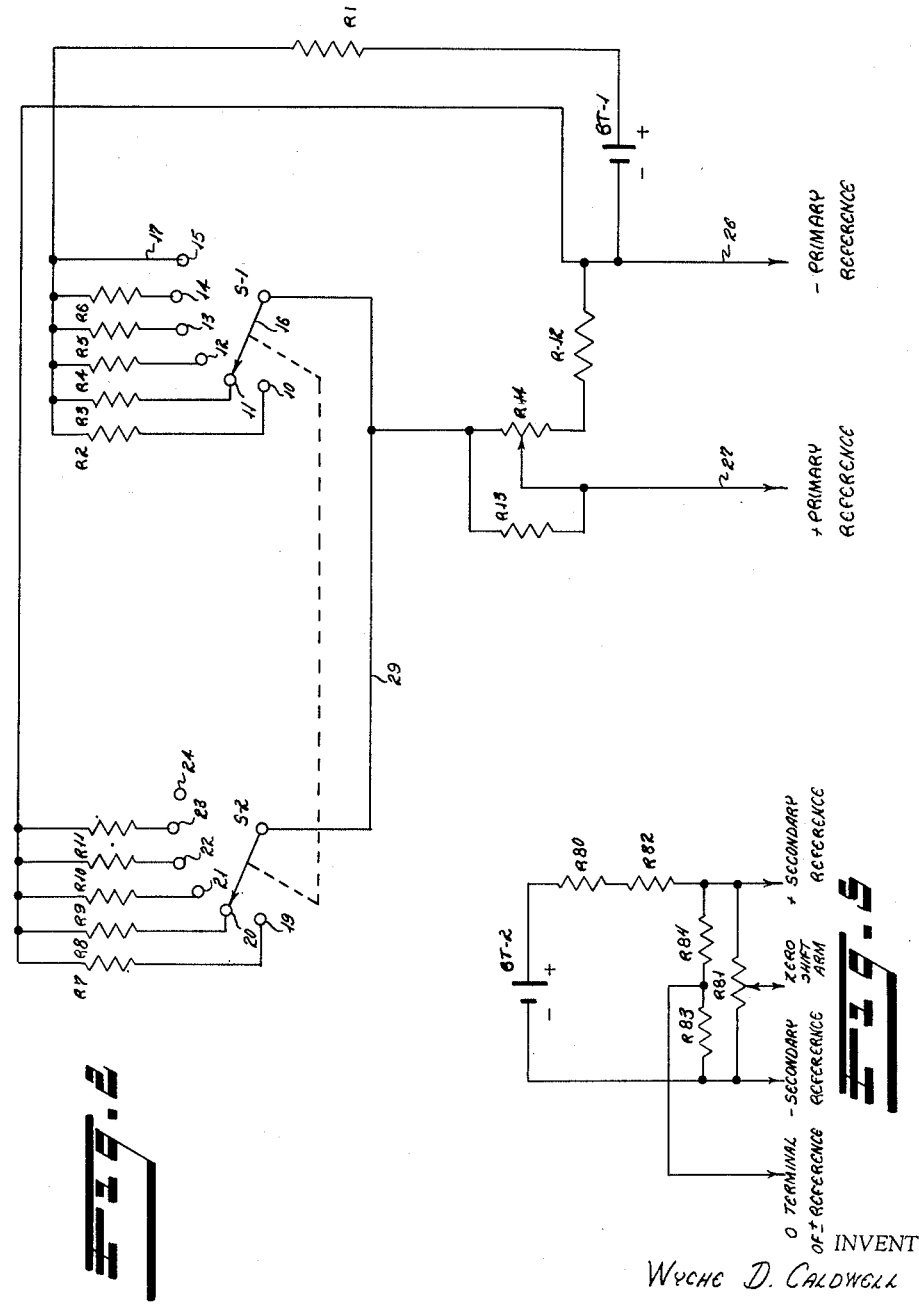

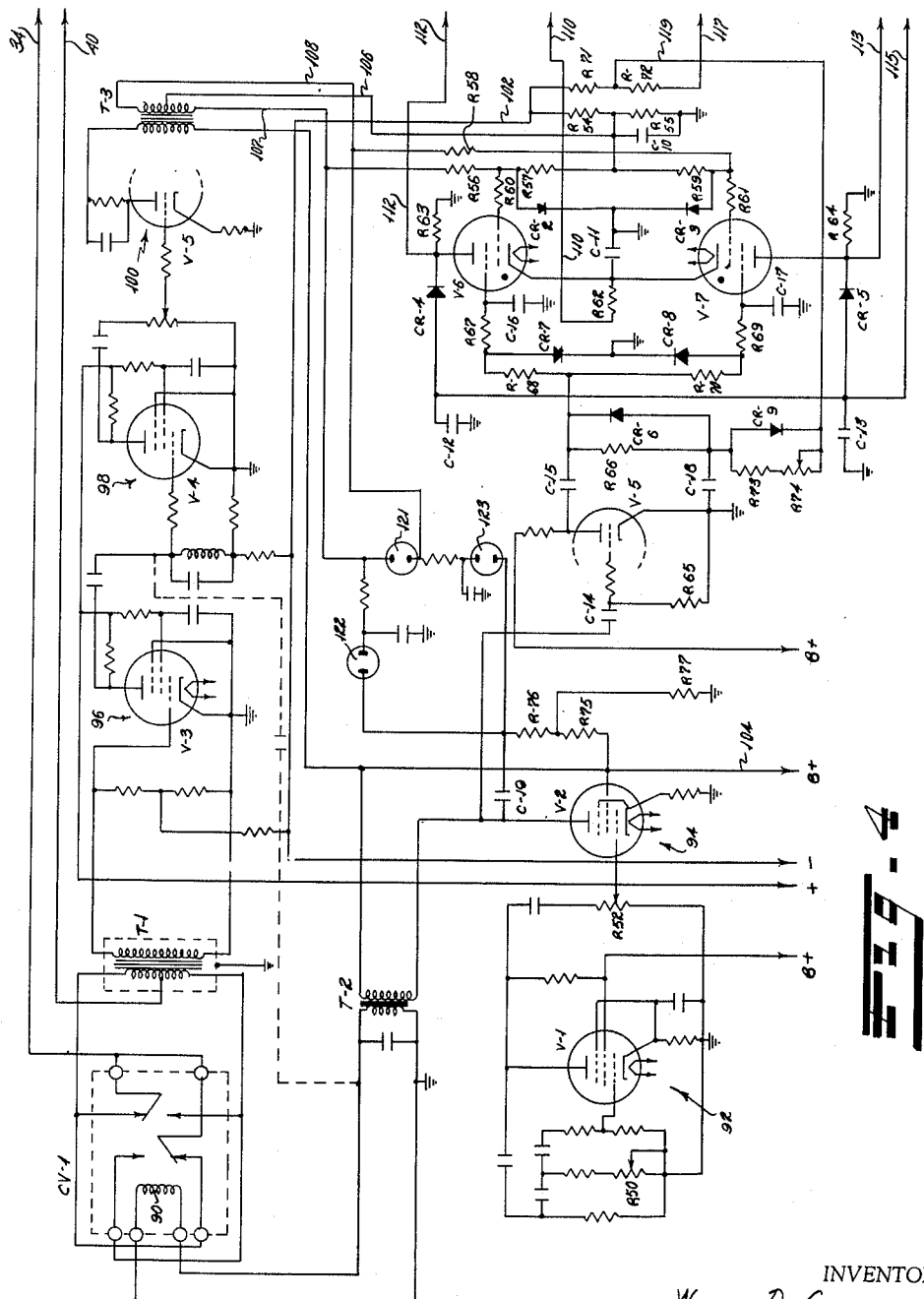

Oct. 13, 1964   W. D. CALDWELL   3,153,193
ELECTRICAL MEASURING INSTRUMENT WITH DIGITAL INDICATION
Filed Feb. 14, 1955   5 Sheets-Sheet 5
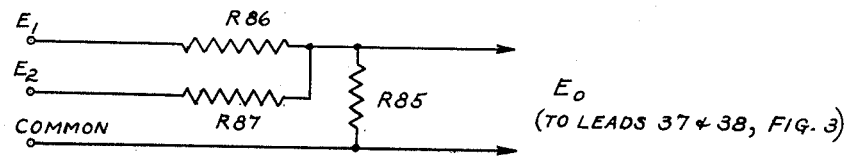
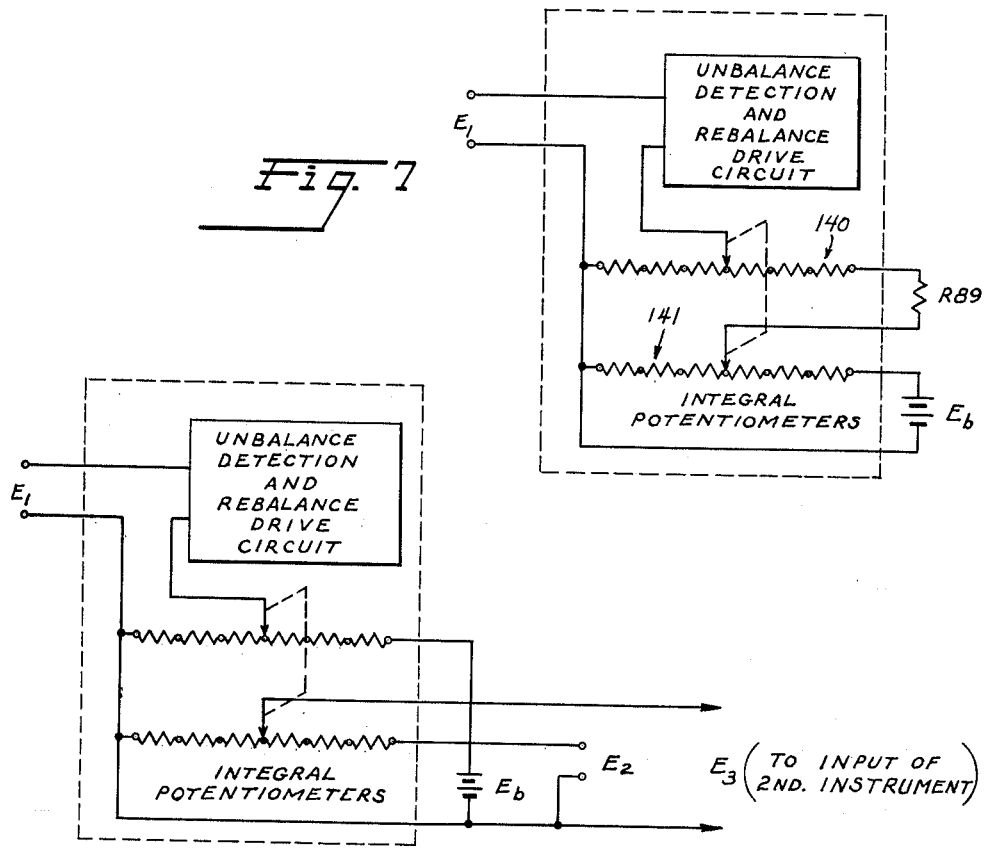
INVENTOR
WYCHE D CALDWELL
BY *Strauch, Nolan & Diggins*
ATTORNEYS

United States Patent Office 3,153,193
Patented Oct. 13, 1964

3,153,193
ELECTRICAL MEASURING INSTRUMENT WITH DIGITAL INDICATION
Wyche D. Caldwell, Van Nuys, Calif., assignor to Whittaker Corporation, a corporation of California
Filed Feb. 14, 1955, Ser. No. 487,830
18 Claims. (Cl. 324—99)

This invention relates to electrical measuring instruments and more particularly to measuring instruments providing analog to digital conversion and digital output indication of the measured variable.

Many problems of applied science in research and industry require the measurement of analog functions which appear as low level D.C. voltages or which may be converted to such voltages by suitable attenuator or transducer devices. It often is desirable to obtain measurements of these functions in terms of decimal numbers, since digital representations may be more quickly noted by the operator and such representations usually are required for present day recording, data reduction and computing systems and for telemetering and other devices which may be used as companion equipment with the measuring instrument.

Electrical measuring instruments having digital output indication or control have previously been proposed, the instruments disclosed in Patent No. 2,625,822 to Nichols and No. 2,497,961 to Shaw being typical of such prior instruments.

The present invention relates to measuring instruments of this general type but characterized by greatly improved accuracy and reliability of measurement, by greater facility of use and versatility of application, and by long service life and relatively low first cost. These objectives are attained in the measuring instruments of my invention by use of the novel potentiometer networks, potentiometer unbalance detection and rebalance drive circuits and other new and improved circuit elements and combinations of elements hereinafter particularly set forth. Operation of the unbalance detection and rebalance drive circuits of the invention is controlled by unbalance voltage sign rather than voltage magnitude and therefore accuracy and reliability of measurement is independent of the stability and degree of amplification of unbalance signals by the necessary signal amplifiers.

Briefly described, the measuring instruments of this invention may comprise a potentiometer network in which the unknown input voltage to be measured is balanced against a reference voltage, means being provided to establish automatically the proper polarity relationship between the input and reference voltage. Any unbalance between the two voltages is fed through a chopper error amplifier to the primary of an output transformer having a center tapped secondary to provide two error signals approximately 180° out of phase with each other, these signals being fed respectively to the control grids of each of a pair of control thyratrons. A reference signal of like frequency to the error signals and having different phase relationships therewith dependent on the sign of the unbalance voltage, is applied to the thyratron grid-shields. The phase relationships operate substantially independently of signal amplitudes to determine which of the two thyratrons is ignited to energize the control circuit individual to it. The potentiometer network includes a number of resistance decades each having a relay driven stepper switch step-wise adjustable to vary the potentiometer output voltage, and means are provided to selectively connect these potentiometer drive relays into the thyratron control circuits in predetermined sequence to be actuated thereby if then energized and to sequentially adjust the decade stepper switches to positions such that the potentiometer is rebalanced. Primary and secondary reference supply means for the potentiometer may be provided, as may null and sign indicator elements and other features enhancing the operation, accuracy and versatility of the instruments as hereinafter explained.

Accordingly, it is the principal object of the invention to provide new and improved electrical measuring instruments for analog-to-digital conversion and digital indication of the measured variable.

Another important object of the invention is the provision of novel electrical measuring circuits including potentiometer networks step-wise adjustable to obtain voltage balance, null detection and potentiometer rebalance drive means operative automatically to adjust the potentiometer networks to balance, and indicator means providing digital indication of potentiometer step positions at balance.

Still another object of the invention is the provision of new and improved null detection circuits in which circuit control is by error voltage sign and is substantially independent of error voltage magnitude, and in which completely drift-free operation is assured by the absence of D.C. amplifying circuits.

A further object is the provision of new and improved D.C. unbalance voltage detection and rebalance drive circuits wherein the unbalance voltage is inverted to provide two differently phased A.C. error signals each of which is applied to one control electrode of each of a pair of shield-grid gas tubes, both tubes having applied to their other control electrode a reference signal substantially in phase with one of the error signals and out of phase with the other whereby one or the other of the tubes is fired, and rebalance drive means connected in the anode circuits of the tubes being actuated on firing thereof.

It is also an object of the invention to provide novel self-balancing potentiometers having digital output indication and including at least one decade of series-connected stepped resistors with step-wise adjustable contacts relay-driven unidirectionally, unbalance voltage detection means including means sensitive to the sign thereof to energize one of a pair of control circuits, and switch mechanism in the control circuits including means selectively connecting the potentiometer drive relays into the control circuits in predetermined sequence to be actuated thereby if then energized and to sequentially adjust the decade resistor contacts to positions such that the potentiometer is balanced.

Also an object of the invention is the provision of novel electrical measuring instruments having automatic digital output representation to companion apparatus, digital output indicating lamp banks or other direct indicating elements, and including means indicating the sign of the input voltage, balance or unbalance between the input and reference voltages and the sign of the unbalance voltage if any.

Another object is the provision of new and improved thyratron and thyratron controlled relay circuits wherein delay elements incorporated into the circuits hold the thyratrons disabled for a finite period of time after each relay actuation thereby, and in which the operation of the thyratrons and relays is otherwise interrelated in a novel manner.

Still another object of the invention is the provision of novel potentiometer networks including primary reference supply means providing ready selection of any of a number of different measurement ranges and/or including secondary reference supply means for offsetting or suppressing fixed levels of potentiometer input voltages.

These and other objects, features and advantages of the invention will become more fully apparent by reference to the appended claims and the following detailed description when read in conjunction with the accompanying drawings, wherein:

FIGURE 1 is a block diagram of a preferred embodiment of the digital measuring instrument of this invention;

FIGURE 2 is a schematic of a potentiometer primary reference supply including temperature compensation and range adjustment means;

FIGURES 3 and 4 show diagrammatically a potentiometer network and potentiometer network unbalance detection and rebalancing systems;

FIGURE 5 is a schematic of a potentiometer secondary reference supply for zero offset;

FIGURE 6 is a schematic of an input circuit usable with the measuring instrument for adapting it to addition or subtraction of two or more input voltages;

FIGURE 7 shows diagrammatically another embodiment of the invention wherein a double potentiometer network is used to provide a digital indication of the square root of the value of an input voltage; and FIGURE 8 shows diagrammatically the measuring instrument of FIGURE 7 with its external connections modified for multiplication of one input voltage by another.

While the measuring instruments of my invention will hereinafter be particularly described as providing digital readings of the measured variable, it is to be understood the instruments also are adapted to applications wherein visual readings are not given or, if given, they are merely ancillary to a recording, control or other function. One such application is in automatic control systems wherein a tolerance or "go, no-go" decision is to be effected by the instrument. For example, the input to the instrument may be derived from a transducer on an automatic production line for measuring some characteristic of each production item moving down the line. Two arbitrary values are preset to determine the range of acceptance of the variable input. Then if the variable input lies within this range the item is accepted and proceeds on down the production line; if it lies outside this range, it is rejected.

Referring now to the drawings, a digital indicating instrument embodying one form of the invention is illustrated in block diagram in FIGURE 1, wherein mechanical linkages are indicated by dotted lines and signal direction where applicable is indicated by arrows.

The measuring instrument of FIGURE 1 is connected to the unknown voltage ($E_{in}$) to be measured through an input line reversing relay K-1 automatically actuated in a manner hereinafter described to establish the required polarity relationship and to indicate the sign of the unknown voltage. If desired, a zero shift circuit (FIGURE 5) may be incorporated into the instrument and interposed in one of the connections to the unknown input voltage to add or subtract a fixed voltage to or from the input voltage, for shifting the point of balance of the input and potentiometer output voltages to obtain zero reading at any desired input voltage level.

A potentiometer network preferably of Kelvin-Varley type as hereinafter more particularly described, comprises at least one set of series-connected uniform resistors and relay actuated stepper switches providing stepwise selection of the resistors across which the potentiometer output voltage is taken and placed in opposition to the unknown voltage. While only one set of stepped resistors is illustrated in FIGURE 1 and only one may be necessary for certain applications, generally a plurality of sets each of different decimal designation are used, to thus obtain measurements to two or more significant figures. In the particular embodiment specifically described hereinafter, three decimally related resistor sets are used to obtain readings to three significant figures, herein termed units ($10^0$), tens ($10^1$) and hundreds ($10^2$).

The potentiometer network is connected in series with the unknown voltage through line reversing relay K-1 as shown, and any unbalance between the input and potentiometer output voltages is inverted by a chopper switch into an A.C. error signal. The chopper may be driven by an oscillator preferably of fixed frequency type, the drive signal from the oscillator being stepped up by a chopper drive amplifier and fed thereby to the drive coil of the chopper switch. A.C. error signals from the chopper are fed through a two stage amplifier the first stage of which may be untuned and the second tuned to remove harmonics from the error signal. The signal then is fed through an amplifier-limiter to the primary of an output transformer having a center-tapped secondary such as to provide two output signals approximately 180° out of phase with each other. These differently phased signals are fed one to each of two shield-grid thyratrons, one error signal being applied to the control grid of the positive control thyratron and the other to the control grid of the negative control thyratron.

The two thyratrons control actuation of the potentiometer stepper switches so as to cause the switches to step in directions and to positions such that the potentiometer output voltage just balances the unknown input voltage. To provide such control it is necessary to determine the sign of the unbalance voltage, and according to the invention this is accomplished by phase comparison of a reference signal from the chopper drive circuit and the two error signals from the output transformer, which as noted above are 180° out of phase with each other. The chopper drive reference signal is of the same frequency as the two error signals and, depending on the sign of the unbalance voltage, is substantially 180° out of phase with one of the error signals and substantially directly in phase with the other.

In accordance with the invention, phase comparison of the reference and error signals is accomplished by coupling the signal output of the chopper drive amplifier to the shield-grids of both thyratrons. Thus, depending on the phase relationship between the chopper drive reference signal applied to their shield-grids and the two error signals applied one to the control grid of one thyratron and one to the control grid of the other, one or the other of the two thyratrons will be ignited and energize its respective control circuit. Since the phase relationship between these signals is in turn dependent on the sign of the unbalance between the unknown and reference voltages, the operation of the thyratrons is controlled by the unbalance voltage sign and they actuate the potentiometer stepper switches in a sequence such as to reduce and ultimately eliminate the unbalance voltage.

A time delay element may be incorporated into the coupling between the chopper drive amplifier and the thyratron shield-grids, to temporarily disable the thyratrons in the manner and for the purpose hereinafter explained.

While any logical method of controlling the advancement of the stepper switches could be used, those which permit searching for the null point with unidirectional stepper switches are preferred. Since it is the primary purpose of the measuring instruments of this invention to determine the numerical value of the null point or to control in accordance therewith, the instrument preferably is arranged to start from a reset (000) position and increase the size of the number until it coincides with the voltage value required to establish a null. Being a digital system and controlled by unbalance voltage sign rather than unbalance voltage magnitude, it cannot detect when the number has had a sufficient number of increments added to it until it has been increased one unit too many and the sign of the unbalance voltage has reversed. Therefore, a potentiometer switch actuation sequence such as illustrated in the following example is employed:

(1) Assume that the point of balance is 673.8.

(2) Starting from reset (000) position, the $10^1$ and $10^2$ stepper switches immediately take one step thereby giving an indication of 099.

(3) Since 673.8 is greater than 099, the positive control thyratron initiates a potentiometer stepper switch drive signal which steps the hundreds ($10^2$) switch from 0 to 6.

(4) Since the overall number (699) is now larger than 673.8, the sign of the unbalance voltage will be reversed.

(5) The negative control thyratron will now fire, which causes the units ($10^0$) stepper switch to step once from 9 to 0, establishing the number 690, and simultaneously transfers control to the tens ($10^1$) column.

(6) The stepper switch for this $10^1$ column is designed to decrease the digital count level as it is advanced; effectively it moves opposite to the hundreds and units stepper switches. Hence as the negative thyratron continues to fire the digit in the tens column steps from 9 to 8 to 7, at which point the overall count level becomes 670 and control is returned to the positive control thyratron.

(7) This thyratron now is connected into the units ($10^0$) column and disconnected from the hundreds ($10^2$) column, hence as the thyratron fires the units stepper advances from 0 to 4 to establish a count of 674, at which point the sign of the unbalance voltage reverses, causing the units switch to stop its advance.

(8) The final overall count, 674 in this example, indicates the point of balance within $-0$, $+1$ count. The instrument then remains static until reset and readout signals are initiated either manually or automatically.

Count indicating switch elements controlled by the thyratrons and potentiometer stepper switches provide externally visible indication of potentiometer setting or serve to control in accordance therewith, or to both indicate and control as desired.

The measuring instruments of the invention may further comprise means providing potentiometer range adjustment, means indicating whether a null exists and the sign of the unbalance voltage if any, manual control of the stepper switches for calibration and other purposes, and additional features enhancing the accuracy, versatility and facility of use of the instruments. These various features will be particularly described hereinafter with reference to FIGURES 2–5.

Referring now to those figures, the primary reference supply illustrated in FIGURE 2 supplies the potentiometer network with the necessary reference voltage of which a part is placed in opposition to the unknown voltage by the potentiometer stepper switches. As shown, the primary reference supply comprises a standard cell BT–1 which may be of any suitable type preferably capable of providing a fixed known output voltage stable over long periods of time. In practice I have found excellent results may be obtained using a bank of parallel connected mercury batteries, which provide a substantially constant output voltage nominally of 1.3 volts. These cells as presently constructed have a voltage-temperature gradient of about 0.1% per 30° F. temperature change, but this may be compensated for by provision of a temperature sensitive resistor R–1 connected in series with the mercury cell bank and having resistance-temperature characteristics such as to cancel the effects of battery output voltage change with temperature. Thus, the voltage change across the resistor R–1 will be equal and opposite to voltage change across the mercury cell bank with temperature change.

The resistance value of resistor R–1 preferably is such that the voltage drop across it normally lowers the voltage supplied to the external circuit by cell BT–1 to precisely 1.0 volts, though other voltage values may be used if desired.

Temperature compensation and voltage adjustment in the manner just described is possible only if the current through BT–1 and R–1 is constant at all settings of the potentiometer and potentiometer range adjust circuit. To this end, the potentiometer network preferably is of the Kelvin-Varley bridge type, which reflects a substantially constant resistance to its primary reference supply regardless of potentiometer switch setting, and the range change circuit employed provides substantially constant current flow regardless of range setting.

As illustrated in FIGURE 2, the range change circuit may include a pair of selector switches S–1 and S–2 ganged or otherwise mechanically interconnected for joint operation as indicated by the dotted line in FIGURE 2. Switch S–1 has a plurality of contacts 10–15, one for each desired voltage range, by which the switch wiper arm 16 may make connection to one of a plurality of resistors R2–R6 or to lead 17, the resistors and lead all being connected at their ends opposite contacts 10–15 to the positive side of standard cell BT–1 through temperature sensitive resistor R–1. Switch S–2 is provided with a like plurality of contacts 19–24 of which one (24) is open and the others each connected to the negative side of BT–1 through one of resistors R7 to R11.

The primary reference output to the potentiometer is taken via leads 26 and 27 directly from the negative side of BT–1 and, through the vernier adjust network next to be described, from the wiper arms of switches S–1 and S–2 which are electrically connected by lead 29 as shown. As is apparent from FIGURE 2 and the foregoing, movement of switches S–1 and S–2 will be effective to place a selected one of the resistors R2–R6 or direct lead 17 in series with the voltage source BT–1 and its temperature compensating resistor R–1, and simultaneously to place the corresponding one of resistors R–7 to R–11 or open circuit in parallel with the circuit comprising BT–1, R–1 and the selected one of resistors R2–R6 or lead 17. Thus, switches S–1 and S–2 may be adjusted to vary the primary reference output voltage by simultaneously switching in a series resistor (R2–R6 or lead 17) to drop the voltage and a shunt resistor (R7–R11 or open) to reduce the resistance reflected to BT–1, the two resistors thus switched in being of relative values such that the current through BT–1 and temperature compensating resistor R–1 remains constant at all output reference voltage settings.

Conveniently, the values of the resistors may be such that the different output voltages are decimally related; i.e., so that when switches S–1 and S–2 have their wiper arms at contacts 15 and 24, respectively, the output voltage to the potentiometer is 1.0 volt, at contacts 14 and 23 the output voltage is 0.1 volt, and so forth.

Continuous adjustment between ranges may be provided if desired by a network comprising two fixed resistors R12 and R13 and an adjustable potentiometer R14 connected as shown. These resistors preferably are of values that on adjustment of potentiometer resistor R14 a constant curve characteristic obtains which permits interpolation of range settings. The network performs two functions to accomplish this; it maintains a constant rate of voltage change throughout the range of the adjustable potentiometer R14 and keeps the impedance reflected by the circuit low. In the selection of resistance values for this network the most advantageous compromise of these two factors should be made.

Referring now to FIGURE 3, the potentiometer network shown is as noted above a Kelvin-Varley type bridge made up of three resistance sets each of which is of different decimal designation and comprises a plurality of precision resistors R15 to R24, R25 to R35 and R36 to R46, the resistors of each set being all of equal value and connected in series between the step contacts of three unidirectional stepper switches S–3, S–4 and S–5, respectively. The entire set of unit ($10^0$) resistors R15–R24 is shunted across a selected two adjacent resistors of the tens ($10^1$) resistor set R25–R35 by leads 25 and 26 respectively connected to the wiper arms of banks B and A of stepper switch S–4, and the entire set of tens resistors is shunted across two adjacent ones of the hundreds ($10^2$) resistors R36–R46 by leads 28 and 29 connected respectively to the wiper arms of bank B and A of stepper switch S-5. The entire set of hundreds resistors is connected to the primary reference supply of FIGURE 2 as by leads 31 and 32.

The wiper arms of all banks A-F of each of the stepper switches S-3, S-4 and S-5 are mechanically linked so as to move together on actuation of the stepper drive mechanism to be described. Hence as stepper switch S-5 (the hundreds switch) moves from step to step, two of the hundreds decade resistors R36-R46 always are shunted across the entire tens decade; and as the tens switch S-4 moves, two resistors of the tens decade R25-R35 always are shunted by the entire units decade. The values of the resistors used in the different decades are so selected that the ten resistors of the $10^0$ (units) decade have a total resistance just equal to the sum of the two resistances of the $10^1$ decade across which they are shunted. Therefore, while there are eleven resistors in the $10^1$ decade, two of these are shunted by the $10^0$ decade and therefore present an effective resistance which is just equal to one unshunted resistor. Hence the eleven resistors of the $10^1$ (tens) decade, with two resistors shunted, present an effective total resistance equal to the unshunted resistance of only ten like resistors, and this total effective resistance is just equal to the resistance of two adjacent resistor in the $10^2$ (hundreds) decade thus reducing the reflected resistance of the eleven resistors of that decade by an amount equal to the resistance of one resistor thereof.

In the arrangement just described, current is divided equally between the resistors of the $10^0$ bank and the two resistors of the $10^1$ bank, across which the $10^0$ bank is shunted, and divided equally between the resistors of the $10^2$ bank and the two resistors of the $10^2$ bank across which the $10^1$ bank is shunted. Because of this division of current between the various resistance elements the effects of contact resistance in the stepper switch contacts are reduced and better accuracy of measurement is obtained. Accuracy is further enhanced by reason of the fact that the potentiometer described is a ratio instrument; it permits an unknown voltage to be measured in terms of a reference voltage by means of the ratio of resistances required to give the particular potential drops needed to balance the two voltages. This assures better precision of measurement because ratios of resistances rather than their actual values control measurement accuracy and the ratio of two resistors generally is more reliable over long periods of time than are the actual resistance values. Also of advantage is the fact that the resistance of the potentiometer reflected to its primary reference supply remains substantially constant at all potentiometer switch settings, which permits constant current flow from the primary reference supply and thus enables temperature compensation and range adjustment in the manner described above.

The selected reference voltage is taken from the potentiometer through leads 34 and 35, the lead 34 being connected at one end to the wiper arm of bank A of the $10^0$ switch S-3 and connected at the other end directly to the unbalance detection means illustrated in FIGURE 4 and described hereinafter. The other lead, 35, is connected at one end to lead 32 from the primary reference supply and at the other to an input line reversing relay K-1A. This relay connects the lead 35 to one or the other of the two leads 37 and 38 carrying the unknown input voltage, and connects the other of the unknown voltage leads 37 or 38 to a lead 40 to the unbalance detection circuit of FIGURE 4. Thus, actuation of relay K-1A is effective to reverse the connection between the unknown and reference voltages so that regardless of the polarity of the unknown voltage it may be connected to be in opposition to the reference voltage from the potentiometer. Capacitors C-1 and C-2 may if desired be provided to shunt any A.C. components superposed on the unknown voltage to ground.

The actuating circuit for input line reversing relay K-1A will later be described; it might here be noted, however, that the actuating coil 42 for this relay is connected in parallel with a neon or other indicator light 44 which when illuminated indicates that the reversing relay is closed, which in turn indicates that the polarity of the unknown voltage originally was reversed with respect to the reference voltage and thus provides an indication of the sign of the unknown voltage.

Also connected in parallel with the actuating coil 42 of relay K-1A is the coil 46 of a second relay K-1B which because of the parallel connection provided operates simultaneously with relay K-1A. This second relay K-1B actuates a double pole, double throw switch one pole 48 of which is effective to connect a common lead 50 to one or the other of two leads 52 and 53. The three leads 50, 52 and 53 are connected to "Cannon" type connector pins ABC, through which a recorder or actuator mechanism of suitable type may be connected. Common lead 50 and its pin B constitute a sign exit, lead 52 and pin A a negative sign emitter and lead 53 and pin C a positive sign emitter. The other pole 56 of the switch actuated by relay K-1B is used to control operation of the sign determining thyratron (V-7 in FIG. 4) in a manner fully explained hereinafter.

After relays K-1A and K-1B have had sufficient time to actuate the switches controlled thereby if such actuation is necessary to obtain appropriate polarity relationship, stepper switches S-3, S-4 and S-5 move to balance the unknown and reference voltages. These switches are of rotary unidirectional relay driven type and preferably have relay drive assemblies which operate in a manner such that the switches S-3, S-4 and S-5 are rotated through one step on deenergization of their respective driving coils 58, 59 and 60. Rotation on deenergization rather than energization of the switch drive relays may conveniently be accomplished by use of pawl and ratchet wheel type stepper mechanisms in which the pawl is spring-loaded in a direction to drive the ratchet wheel one step each time the pawl is "cocked" by energization of the drive coil and released by deenergization thereof, the wiper arms of the switch being carried by or otherwise mechanically linked to the ratchet wheel so as to make contact with different ones of the stationary contacts for each position of the ratchet wheel.

The actuating relays for the three stepper switches S-3, S-4 and S-5 are designated K-100, K-101 and K-102, respectively, in FIGURE 3, and in addition to the main stepper switch each also actuates one of the "off-home" switches S-6, S-8 and S-10, and one of the "interrupter" switches S-7, S-9 and S-11. Each of the "off-home" switches preferably is opened and closed by a cam surface formed on one of the switch rotor elements, the cam being so arranged that the "off-home" switch contacts occupy the positions illustrated whenever the stepper switches are at the stations designated "HOME" in FIGURE 3 and occupy the reverse positions at all other stations, from 0 to 9, of the stepper switches. The "interrupter" switches S-7, S-9 and S-11 are controlled by the stepper switch relay armatures; they occupy the positions shown whenever the armature drive coil is deenergized and the reverse positions when the armature is shifted by energization of its driving coil. Any suitable mechanical linkage between the relay armatures and "interrupter" contacts may be employed, it being only necessary that the contacts be shifted to reverse positions as the armature approaches the limit of its travel after energization of its driving coil, and to resume their original positions as the armature returns to rest position.

The "off-home" and "interrupter" switches perform a number of functions relating to thyratron control, manual advance of the stepper switches and instrument reset, these and other functions thereof being fully set forth hereinafter.

The stepper switch drive coils 58, 59 and 60 each have one end connected to a lead 62 to a power supply of suitable positive voltage and one end connected selectively to open circuit or to ground potential either manually or by the unbalance voltage detection and rebalance mechanisms to be later described with reference to FIGURE 4.

For manual energization of coil 58 and actuation of the units switch S–3, a lead 64 to this coil may be connected to ground through a switch 66 having normally open contacts manually closeable to accomplish this result. The switch also is provided with normally closed contacts 72 as shown, which serve to disable the sign-determining function of the associated unbalance detection and rebalancing circuit as will become apparent hereinafter.

The manual control for stepper switch S–3 is independent of those for stepper switches S–4 and S–5, but the controls for the latter two switches are interrelated in the following manner. Manual switch 70 for the hundreds stepper switch S–5 when closed directly grounds one end of the driving coil 60 of that stepper switch causing it to move one step from its "HOME" to its "0" position. Simultaneously, the driving coil 59 of the tens switch S–4 is, through manual switch 70, lead 74, contacts 8 and 9 of interrupter switch S–11, contacts 3 and 4 of off-home switch S–8 and contacts 8 and 9 of interrupter switch S–9, connected to ground and thus causes the tens switch S–4 to move one step from its "HOME" position.

This interconnection between the actuating circuits of switches S–4 and S–5 is necessary in order to obtain the desired sequence of switch operation summarized above in reference to FIGURE 1. After the tens and hundreds switches S–4 and S–5 have taken this one step together the electrical linkage between their actuating circuits is broken by opening of contacts 3 and 4 of off-home switch S–8 through which the linkage is effected. Thereafter, manual switch 70 will control only the operation of the hundreds switch S–5 and manual switch 69 will control only the operation of tens switch S–4. By repeatedly opening and closing the manual switches 68, 69 and 70, it thus is possible to set up any desired potentiometer output voltage for calibration, reference or other purpose.

Turning now to the means whereby the positions of the three stepper switches are visibly displayed to the operator and/or communicated to associated apparatus for control by the measuring instrument, bank B of the units stepper S–3 and bank D of both the tens and hundreds steppers S–4 and S–5 are connected to actuate a series of neon bulbs or similar indicating elements in accordance with the positions of the switches and the potentiometer output voltage set up thereby. While for purposes of clarity of illustration only three of the neon bulbs controlled by each of the stepper switches are shown, it will be understood that in practice 10 neon bulbs are provided for each of the units and ten switches and 9 neon bulbs for the hundreds switch, no zero position neon bulb being necessary in the hundreds column. The space which otherwise would be occupied by this omitted bulb may if desired instead be used to mount the negative sign neon bulb 44 described above.

The neons 0–9 in bank B of the units switch S–3 are connected to ground by a lead 75 to contacts 2 and 1 of off-home switch S–10, and to a suitable supply voltage source by the bank B wiper arm of switch S–3, lead 76, driving coils 78 and 79 of reset and reset release relays K–2 and K–3, respectively, to voltage supply line 80. It is to be understood that the current flow to the selected one of the units column neon bulbs is inadequate to actuate the relays K–2 and K–3, the operation of which will be set forth hereinafter.

The neons 9–0 controlled by bank D of the tens stepper switch S–4 have a common connection via lead 81 directly to the power supply line 80, and are selectably connected by the wiper arm of switch bank D to a lead 83 to ground. The diode CR–1 also connected to lead 83 and to the "9" and "HOME" contacts of bank B of the units switch S–4 is for control of reset and reset release relays K–2 and K–3 as will later be described.

The neons 1–9 connected into bank D of the hundreds switch S–5 have a common connection to ground and are selectively connected to power supply line 80 by the stepper switch wiper arm as clearly shown.

For supplying a measurement indication to external apparatus such as the above-mentioned "go, no-go" quality control system controlled by or otherwise interrelated with the instrument, bank C of the units switch S–3 and banks E of the tens and hundreds switches S–4 and S–5 have corresponding contacts each connected by leads to "Cannon" or other connector pins D–N constituting emitters for digits 0 to 9. The wiper arms of these banks of switches S–3, S–4 and S–5 are connected respectively to leads to similar connector pins P, Q and R constituting $10^0$, $10^1$ and $10^2$ exits, respectively. Thus, the units readings of the instrument may be detected across connector pins P and D–N, tens reading across pins Q and D–N, and hundreds readings across pins R and D–N for external control, recording or other desired application.

It is believed the structure and function of the remaining elements in the circuits of FIGURE 3 can best be explained in terms of their relationship to the unbalance detection and servo amplifier rebalance drive circuit of FIGURE 4, hence attention is now directed to that figure.

The servo amplifier shown in schematic in FIGURE 4 acts as a null detector to control the operation of the units, tens and hundreds stepper switches in the manner necessary to establish a null condition. Any unbalance between the unknown input and potentiometer output voltages results in the existence of an error voltage across leads 34 and 40 from the circuit of FIGURE 3, which error voltage is as shown in FIGURE 4 applied to the amplifier input transformer T–1 through a chopper switch CV–1 preferably of a type capable of operation at frequencies of the order of 800 cycles per second. The chopper is shown powered by a driving coil 90 at this or other selected frequency, the driving coil being supplied with A.C. driving current by an oscillator generally designated by reference numeral 92 through a chopper drive amplifier designated by reference numeral 94. Oscillator 92 may be a conventional three section RC phase shift oscillator as illustrated, the resistance R50 in one section being variable to provide a degree of control over the oscillator output frequency if desired.

The oscillator output is fed to chopper drive amplifier 94 through a gain control resistor R52 adjustable to vary the input to amplifier 94. The amplified drive signal is applied to the driving coil 90 of the chopper switch through a matching transformer T–2 the output of which powers the chopper drive coil.

Chopper switch CV–1 comprises a double throw switch which may be of single pole type or double pole as illustrated; if the latter the two poles may be parallel connected as shown to reduce arcing at the switch contacts. One of the leads 34 and 40 across which the unbalance voltage, if any, is impressed, is connected to the center tap of transformer T–1 and the other connected alternately to the two end taps thereof by the chopper, thus providing an A.C. error signal output from the secondary of the transformer whenever any unbalance voltage appears across leads 34 and 40.

This error signal is fed to an untuned amplifier generally designated by reference numeral 96 and then to a second amplifier indicated by numeral 98 which may be tuned to remove harmonics and other unwanted frequencies from the error signal. The amplified error signal next is impressed on the grid of an amplifier-limiter 100 which may comprise one half of a twin triode as shown.

The primary of an output transformer T-3 is connected into the plate circuit of the amplifier-limiter tube, and the secondary of this transformer is center tapped so as to provide between its common lead 106 and one end lead 107 an A.C. output signal which is substantially 180° out of phase with the similar signal provided between its common lead 106 and its other end lead 108, these differently phased signals being of substantially equal magnitude.

Center tap lead 106 from transformer T-3 may be referenced to a fixed negative voltage as by the voltage divider network shown comprising resistors R54 and R55 of which one is connected to a negative voltage supply line 102 and the other connected to ground and shunted by by-pass capacitor C-10. The center tap lead thus referred to a fixed negative voltage is connected to the two end leads 107 and 108 from transformer T-3 through a matched pair of voltage dividers comprising resistors R56 and R57 and resistors R58 and R59, respectively, between which connection is made to the grids of the positive and negative control thyratrons V-6 and V-7 through resistors R60 and R61, respectively. A pair of diodes CR-2 and CR-3 may be connected to the thyratron grids as shown to limit signal swing and prevent the grids going so far toward the positive as to fire the thyratron regardless of the signal on its other control electrode.

There is thus applied to the control grid of one of the two thyratrons V-6 and V-7 an error signal which is approximately 180° out of phase with the error signal applied to the control grid of the other, and as will be explained these differently phased error signals coact with a reference signal applied to the shield-grids of both thyratrons to ignite one or the other of the thyratrons dependent on the sign of the error voltage.

The cathodes of the two thyratrons normally are grounded through a relatively small cathode bias resistor R62 which is shunted to ground by by-pass capacitor C-11 and connected by lead 110 to the potentiometer circuit of FIGURE 3 wherein connection to ground is made. It should be noted, however, that this connection to ground is on occasion broken for the purpose and in the manner set forth hereinafter.

The thyratron anodes are connected by leads 112 and 113 into the potentiometer circuit of FIGURE 3 and as will become apparent this circuit normally holds the anodes at high positive potential by connection through one or more of the stepper switch drive coils to their high voltage supply line 62 (FIGURE 3). The thyratron anodes may if desired be connected to ground through high resistances R63 and R64 (FIGURE 4) which coact with the RC networks (not numbered) shown in FIGURE 3 as connected across each of the driving coils 58, 59 and 60 of stepper switch relays K-100, K-101 and K-102, to damp self-excited current oscillations in the relay coils and thus minimize relay chatter.

The anodes of thyratrons V-6 and V-7 are as shown provided with further connections to the cathodes of a pair of diodes CR-4 and CR-5 the anodes of which are connected to a pair of capacitors C-12 and C-13 to ground. A lead 115 from this diode-capacitor network to the "start record" relay K-4B in the potentiometer network of FIGURE 3 serves to hold that relay energized so long as either thyratron continues periodically to fire, as will later become apparent.

As pointed out above, the operation of the unbalance detection and rebalance drive mechanism of the invention is controlled primarily by the sign of the unbalance voltage rather than by its magnitude. In accordance with the invention, the necessary determination of the sign of the unbalance voltage and control of the thyratrons thereby is effected by comparing, as to phase, the two unbalance signals from error signal output transformer T-3 and a reference signal of like frequency to the two error signals. The reference signal may be obtained from the chopper drive amplifier and is coupled to the thyratron shield-grids so that the phase relationship between the reference signal applied to the two shield-grids and the two error signals applied each to the control grid of one thyratron determines which if either of the two thyratrons will fire. As noted, the two error signals are substantially 180° out of phase with each other and the reference signal is substantially in phase with one of the error signals and 180° out of phase with the other, the phase relationship obtaining at any particular time depending on the sign of the unbalance voltage at that time. Thus, if the unbalance voltage is negative the reference and error signals applied to the shield grid and control grid of negative control thyratron V-7 will be of like phase and the thyratron will fire; the reference and error signals applied to positive control thyratron V-6 will be approximately 180° out of phase and therefore that tube will remain idle. Conversely, if the unbalance voltage is positive then V-6 will fire and V-7 remain idle.

The reference signal from chopper drive amplifier 94 may conveniently be applied to the shield-grids of thyratrons V-6 and V-7 through a limiter-differentiator which is capacitance coupled by capacitor C-14 to the output circuit of the chopper drive amplifier. The limiter-differentiator may comprise half the twin triode V-5 as shown, with its grid bias provided by resistor R65 and its output signal coupled by capacitor C-15 to a load resistor R66 which as shown is by-passed by a diode CR-6 providing the desired differentiating function. The reference signal thus differentiated is applied to the shield-grids of thyratrons V-6 and V-7 through resistance networks comprising resistors R67 and R68 and resistors R69 and R70, respectively, and small by-pass capacitors C-16 and C-17. The anodes of a pair of diodes CR-7 and CR-8 having grounded cathodes may be connected between resistors R67 and R68 and between resistors R69 and R70, respectively, to limit swing of the thyratron shield-grids toward the positive. The shield-grids normally are referenced from a voltage divider network connected between a negative voltage supply and ground as will be described.

Thyratrons V-6 and V-7 may be extinguished after firing by breaking connection of their anodes to the positive voltage supply; this is effected by the stepper switch interrupter contacts in the potentiometer circuit of FIGURE 3 as will later be explained. It is to be noted, however, that this break is only momentary and that the thyratron anodes are almost immediately reconnected to their voltage supply through the stepper switch relay coils. Since finite time is necessary for the stepper switch to complete its movement, which is initiated by the firing of a thyratron, and for the error signal amplifier to stabilize to the different degree of unbalance resulting from stepper switch movement, it is necessary to disable the thyratrons for a period of time sufficient to permit the stepper switch to complete its movement and the amplifier to stabilize before again placing the thyratrons under control of the amplified error signal. Otherwise the thyratrons could again fire immediately on re-closing of the interrupter contacts and might thus render the circuit self-cycling.

This time delay is provided in accordance with the invention by incorporating a delay element in the thyratron shield-grid referencing network, the delay element functioning first to swing the shield-grids immediately toward the negative to thus disable the thyratrons, and then acting to permit shield-grid potential to slowly decay back to thyratron firing potential. The delay element may as shown comprise a voltage divider network of resistors R71 and R72 connected to negative supply voltage lead 102 and to a lead 117 to the circuit of FIGURE 3. This lead 117 normally is connected to ground through the interrupter contacts of each of the stepper switches S-3, S-4 and S-5, but wherever any one of these switches is actuated the connection to ground is momentarily broken and the lead 119 to the point of connection between resistors R71 and R72 swings immediately to the full negative voltage of supply lead 102. This voltage swing of lead 119 is effective to cause a corresponding swing in thyratron shield-grid bias, via the lead 119 and a diode CR-9 connected into the shield-grid referencing circuit as shown. It also is effective to charge a capacitor C-18 in the shield grid circuit between diode CR-9 and ground.

As noted, the voltage divider network is almost immediately reconnected to ground by re-closing of the interrupter switch contacts, causing lead 119 to the shield-grid circuit to swing immediately back toward the positive and to its normal less negative potential. The shield-grids cannot immediately follow this positive swing of their referencing network, however; they can only slowly decay back to original potential as capacitor C-18 discharges through resistors R73 and R74, current flow through the other branch of the referencing network being blocked by diode CR-9.

Thus, each time a thyratron fires and actuates ones of the stepper switches and its associated interrupter switch certain of the contacts of the latter switch momentarily break the connection of the thyratron anode to its voltage supply and thus momentarily extinguish the thyratron, and other interrupter contacts break the connection of thyratron shield-grid referencing networks R71, R72 to ground and thus cause the shield-grids to swing toward the full negative potential of their referencing network voltage supply. This disables the thyratrons already extinguished and they remain disabled for a finite time because the delay elements incorporated in the shield-grid referencing network allow the voltage on the shield-grid to decay back to firing potential only after a time interval sufficient for the stepper switch to complete its movement to the next step and the amplifier to stabilize at the new unbalance voltage.

The time relay interval may if desired be made variable by use of a variable resistor as indicated at R74 in the delay circuit. The delay interval preferably is made as short as possible consistent with freedom from overshooting of measurements, and in general should be approximately 10 to 15 milliseconds.

Three neon or similar indicators 121, 122 and 123 may be provided if desired for indicating the presence or absence of a null and the sign of any unbalance voltage at the potentiometer. The null indicating light 121 is connected directly between the two end leads 107 and 108 of output transformer T-3, and therefore lights whenever an unbalance voltage is impressed on the transformer primary.

The two sign indicating lights 122 and 123 each have one side connected to one of the output transformer end leads 107 and 108 and the other connected to an A.C. reference supply of like frequency to the error signals if any on the transformer output leads. This reference supply is obtained by a capacitance coupling to the anode circuit of the chopper drive amplifier 94 through a capacitor C-19, the coupling circuit being referenced to a positive voltage supply through a divider network comprising resistors R75, R76 and R77. Here, similar to the thyratron firing described above, which of the two lights 122 and 123 is energized depends on the phase relationship between the A.C. reference signal from the chopper drive amplifier and two error signals from the ouput transformer T-3. When no error signal exists the A.C. reference supply is itself inadequate to light either of the two neons; when error signals exist one of the two will have a phase relationship with the reference signal such that the error and reference signals are additive and together are of magnitude sufficient to light the respective neon 122 or 123. The other error signal will not be additive to the reference signal and neither signal alone is adequate to energize the neon; it therefore remains unlit and the other, lighted neon provides sign indication.

The sign indicator lamps 122 and 123 are not to be confused as to function with the sign relay lamp 44 (FIGURE 3) described above. The lamp 44 merely indicates whether the two input polarity reversing relays K-1A and K-2A have been energized as a result of the initial sign determination, and after this determination has been made provides an indication as to whether the input voltage is positive or negative. The two sign indicator lamps 122 and 123 provide a continuing indication of the sign of the unbalance between the input and reference voltages, and the direction and sign of this unbalance voltage change as the instrument performs its balancing operation. In reset (home) position, however, the reference voltage is zero and therefore in this one position the two lamps 122 and 123 do indicate whether the input voltage is positive or negative with respect to zero. Thus, while the instrument is in "reset" condition and until the readout cycle is initiated, lamps 122 and 123 indicate the sign of the input voltage with respect to zero; after the readout cycle has commenced the lamp 44 takes over this function and the lamps 122 and 123 then indicate the relative magnitude of the input voltage with respect to output voltage of the potentiometer network.

Referring now to both FIGURES 3 and 4, the operation of the measuring instrument and those of its components not yet specifically described will be set forth in terms of the sequence of action of the instrument as it makes one measurement and then is returned to home (reset) position. FIGURES 3 and 4 show all elements of the circuit in "reset" condition except the "start record" relay K-4B, which normally is energized on reset.

The instrument is first connected to a power supply for the various positive and negative voltages necessary to its operation; the power supply may be of conventional type and preferably is housed in the same casing as the measuring instrument proper. Immediately on connection to the power supply the "start record" relay K-4B is energized through contacts 9 and 8 of "readout" relay K-5 and contacts 12 and 11 of reset relay K-2 to ground; all other elements of the circuit remain at rest. When an unknown voltage to be measured is applied to the input leads 37 and 38 to the instrument, the null indicator neon 121 and one or the other of the sign indicator neons 122 and 123 light to indicate the existence of an unbalance voltage and its sign.

Measurement of the applied input voltage is initiated by manually closing a "readout" switch S-12 which may be front panel mounted and connected in parallel with a footswitch (not shown) if foot operation also is desired. Closing this switch is effective to ground the cathodes of thyratrons V-6 and V-7 via lead 110, normally closed contacts 8 and 9 of a second "start record" relay K-4A, through the readout switch S-12, normally open contacts 1 and 2 of relay K-4B, and normally closed contacts 9 and 8 of "reset" relay K-2 to ground. With their cathodes grounded, control thyratrons V-6 and V-7 become operative to sense the sign of the unbalance voltage and to be ignited accordingly. The closing of readout switch S-12 also is effective to start a time delayed energization of a "readout" relay K-5, the driving coil 125 of this relay having one side connected directly to power supply line 80 and its other side connectable to ground through a delay network comprising resistor R78 and capacitor C-20, through the readout switch S-12, contacts 1 and 2 of "start record" relay K-4B and thence to ground via the same circuit as just described in reference to the thyratron cathodes. The purpose of this time delay is to permit the sign relays K-1A and K-1B to complete their sign determination and input line reversal, if reversal is necessary, before connecting the thyratrons into the potentiometer stepper switch circuit.

If the input voltage sign is negative a circuit will be completed from the anode of the negative control thyratron V-7 via lead 113, normally closed contacts 72 of the 10° manual advance switch 66, normally closed contacts 2 and 3 of readout relay K–5, lead 127, and through the driving coils 42 and 46 of sign relays K–1A and K–1B, to voltage supply line 89, delay elements R79 and C–21 being incorporated in this circuit to give a short time delay to permit the circuit to stabilize before the sign determination is made. This circuit will energize the sign relays, and K–1A will act to reverse the unknown voltage input to the potentiometer network. Switch contacts 50, 52 and 53 of relay K–1B provide a sign indication to external control apparatus or the like, and the other contacts 56 and 57 of this switch act to hold the relays K–1A and K–1B, if once energized, through contacts 6 and 5 of reset relay K–2. As noted above, the sign indicating lamp 44 is in parallel with the driving coils of relays K–1A and K–1B, hence this lamp lights whenever the sign relays are energized and thus indicates that the input voltage is negative. If the lamp remains unlit, this indicates that the unknown voltage is positive.

After completion of the sign determining function of relays K–1A and K–2A, the readout relay K–5 becomes energized through its delay network explained above, and the relay holds through its contacts 4 and 5 and through contacts 11 and 12 of reset relay K–2 to ground. Thus, the operator may release the readout switch S–12 to open and readout relay K–5 will continue to be energized through the circuit described.

Energization of readout relay K–5 discontinues the polarity switching function of the negative control thyratron by opening contacts 2 and 3 of the readout relay through which this thyratron is coupled to the sign relays K–1A and K–2B. Also, when contacts 8 and 9 of readout relay K–5 open this starts to deenergize the start record relay K–4B. Deenergization of this relay is delayed, however, in the manner explained hereinafter.

The thyratron cathodes still are held at ground, though the circuit to ground now is through contacts 8 and 9 of start record relay K–4A, contacts 4 and 5 of readout relay K–5 and contacts 12 and 11 of reset relay K–2, rather than through readout switch S–12 as before. The anode circuits of both thyratrons are open, hence neither thyratron will now fire.

The tens and hundreds stepper switch relays K–101 and K–102 each take one step, being energized by connection to ground through contacts 7 and 8 of readout relay K–5, contacts 3 and 4 of off-home switches S–8 and S–10, respectively, and contacts 9 and 8 of interrupter switches S–9 and S–11, respectively. The hundreds relay K–102 by its off-home contacts 1 and 2 turns on the "9" lamp in the units column lamp bank, and the tens relay K–101 turns on the "9" lamp in its own lamp bank thus giving a reading of 099.

During the time interval between the opening of contacts 8 and 9 of readout relay K–5 and the firing of either thyratron, the charge current of capacitors C–12 and C–13 (FIGURE 4) will hold the start record relay K–4B energized. When either thyratron fires, this effectively grounds and thus energizes the driving coil of relay K–4B through lead 115 and diodes CR–4 and CR–5 and at the same time recharges capacitors C–12 and C–13 through these diodes. Then, when the ignited thyratron is extinguished, the capacitors C–12 and C–13 again discharge through the coil of relay K–4B. Thus, so long as either thyratron continues periodically to fire, relay K–4B will remain energized and continue the measuring function of the instrument.

If the input voltage is greater than the 099 reading established by the first step of the tens and hundreds steppers K–101 and K–102, the positive control thyratron V–6 will fire and, through bank F of the hundreds stepper switch S–5, the now closed contacts 4 and 5 of off-home switch S–10 and contacts 8 and 9 of interrupter switch S–11, periodically energizes the hundreds relay K–102 and causes it to step from "0" towards "9," this action continuing until such time as the unbalance voltage becomes negative and the positive control thyratron ceases firing. The other contacts, 6 and 7, of interrupter switch S–11 act to break the connection of the thyratron shield-grid referencing circuit to ground, thus holding the thyratrons disabled for a finite period of time after each actuation of the potentiometer switches in the manner explained above in reference to FIGURE 4.

If the input voltage was less than the 099 reading initially established, or if it was greater than 099 and the hundreds stepper has now stepped up past it as described in the preceding paragraph, to give a reading X99 where X is the hundreds digit, the unbalance voltage will in either case now be negative and the negative control thyratron will be ignited accordingly. This thyratron presently controls only the units stepper K–100, control being through the "HOME" contact of bank D of units switch S–3, now closed contacts 1 and 2 of off-home switch S–8 (in the tens relay K–101) and contacts 8 and 9 of interrupter switch S–7 of the units relay K–100. This relay takes only one step, upon which the said connection through its bank D "HOME" contact is broken. This one step places the number "0" in the units column to give a reading of X90, and also transfers the negative control thyratron anode to the tens relay K–101 through the "0" position contact of bank D of units switch S–3. Simultaneously, the positive control thyratron anode is transferred from the hundreds relay K–102 to the units relay K–100 through contacts 4 and 5 of the units off-normal switch S–6 and through bank F of units stepper switch S–3.

Now, one or the other of the two control thyratrons will fire depending on whether the input voltage is greater or smaller than the present potentiometer setting, X90. If smaller, the unbalance voltage will be negative and the negative control thyratron will energize the tens relay K–101 and cause it to step in a direction to decrease the tens reading, the relay continuing to step until it reaches a position such that the unbalance voltage becomes positive.

If the input voltage was greater than the reading X90 so that the unbalance voltage was initially positive, or when the unbalance voltage becomes positive by reason of movement of the tens stepper as just described, the positive control thyratron is ignited by the positive error signal and actuates the units stepper K–100. When K–100 advances from its "0" position, the contacts of its stepper switch bank D open and disconnect the negative control thyratron from the tens relay K–101, thus disabling the negative control thyratron. The units relay continues to advance until the error voltage becomes negative, at which point the potentiometer reading will give the value of the unknown voltage accurately to three places, the units number of the reading being the whole number next above the actual input voltage third place number.

As noted, the error voltage becomes negative when the units stepper K–100 reaches balance position. The negative control thyratron has been disconnected by K–100 as set forth in the preceding paragraph, however, and therefore does not fire. Since neither thyratron now fires, the start record relay K–4B held energized by the thyratrons in the manner explained above is now deenergized. Accordingly, its contacts 2 and 3 close and energize the second start record relay K–4A through contacts 9 and 8 of reset relay K–2 to ground. Normally closed contacts 8 and 9 of relay K–4A open and break the circuit from the thyratron cathodes to ground. Normally open contacts 1 and 2 of relay K–4A close and transmit a "start record" signal to associated recording or control apparatus through "Cannon" connection pins S and T or similar connections. Relay K–4A holds through its contacts 4 and 5 and through contacts 6 and 5 of reset relay K–2 to ground.

The instrument now remains inactive until a reset signal is initiated. A reset switch S–13 is provided for this purpose, or an external reset switch may if desired be connected between connection pin U and ground. Closing of either switch will actuate the reset relay K–2, upon which its contacts 5 and 6 open to release the polarity reversing relays K–1A and K–2A if these are held; its contacts 8 and 9 open and release the start record relay K–4B which has been held; and its contacts 11 and 12 open to release the readout relay K–5 which has been held and also to disable the readout switch S–12.

Contacts 1 and 2 of reset relay K–2 close thereby holding the reset relay through contacts 6 and 5 of reset release relay K–3 to ground. Contacts 4 and 5 of reset relay K–2 close, thereby resetting the tens stepper K–101 to its "HOME" position through its off-home contacts 4 and 5 and its interrupter contacts 8 and 9. When K–101 reaches "HOME" its off-home contacts open and disable this reset circuit. Similarly, contacts 7 and 8 of reset relay K–5 close to reset the units stepper K–100 through its off-home contacts 1 and 2 and interrupter contacts 8 and 9; and contacts 10 and 11 of the reset relay close to reset the hundreds stepper K–102 through its off-home contacts 4 and 5 and interrupter contacts 8 and 9. The steppers K–100, K–101 and K–102 are self-cycled back to "HOME" positions by their interrupter contacts and are stopped when they reach "HOME" positions by opening of their off-home contacts.

One side of the driving coil of reset release relay K–3 is grounded through contacts 2 and 1 of reset relay K–2 and through its own contacts 5 and 6. The other side of the reset release relay is at this time connected to power supply line 62, through a circuit including a lead 130 to wiper B of the units switch S–3 and to its "HOME" contact, through diode CR–1 to wiper D of the tens switch S–4 and to its "HOME" contact, and through wiper D of the hundreds switch S–5 to its "HOME" contact which, as shown, is connected directly to power supply line 62. Thus, after all the stepper switches have reached their "HOME" positions this reset release circuit is completed and reset release relay K–3 energized. Contacts 5 and 6 of relay K–3 then open, and release the reset relay K–2 which was held through those contacts and its own contacts 1 and 2. This action releases both the relays K–2 and K–3, and the instrument now is in reset condition and ready for another measurement to be initiated by manual actuation of readout switch S–12.

The time required for each measurement depends on the particular value of the unknown voltage being measured, since the number of stepper switches which must be adjusted to balance position and the number of steps which they must take to reach balance position depends on the numerical value of this voltage. In general, the time for each measurement and reset cycle will vary from about 0.2 seconds to about 0.8 seconds depending on the particular voltage value measured.

Turning now to the secondary reference supply or zero shift circuit of FIGURE 5, this circuit may if desired be housed in the same casing with the measuring instrument and comprises a voltage source BT–2 which may be of the same mercury cell type as source BT–1 and temperature compensated by a temperature sensitive resistor R80. A potentiometer R81 connected across the source BT–2 and its series resistors R80 and R82 is used as a voltage divider controlling the magnitude of the zero shift output voltage, connection being made to the movable contact of this resistor and to one or the other of the leads designated "+ secondary reference" and "– secondary reference" depending on whether positive or negative zero offset is desired. A pair of matched resistors R83 and R84 may if desired be connected in parallel with potentiometer R81 to provide a fixed offset voltage either positive or negative or to provide a zero shift voltage continuously variable either positive or negative from zero. Suitable connections and jumper terminals are provided for various modes of interconnection of this supply circuit to other measuring instrument elements in accordance with application requirements.

The secondary reference circuit of FIGURE 5 is most frequently used for zero offset, and for this use one side of the unknown voltage to be measured is connected in series with one of the two leads from the secondary reference supply across which the desired offset may be obtained, the other side of the unknown voltage and the other of the two selected secondary reference output leads being connected one to each of the two leads to the potentiometer network.

Inasmuch as the measuring instrument of the present invention is a precision instrument, it generally is desirable that it be calibrated with reference to an externally known standard. The calibration procedure is as follows:

(1) The known standard voltage is applied to the input of the measuring instrument. At the reset condition the polarity is indicated by the null indicator lamps 122 and 123 (FIGURE 4).

(2) The numerical value of the standard voltage, or any number having a desired numerical relationship to the standard voltage, is set up on the instrument. To do this, the manual advance switches are depressed in the following sequence:

(A) First the hundreds digit is introduced into the first column. It should be noted that the first step position—which establishes the number "0"—will not be indicated by a lamp since this lamp position is used for the negative sign lamp. The initial step will also light the "9" lamps in the tens and units columns.

(B) The tens digit is introduced into the second column. Unless the required tens digit is nine, the tens advance switch 69 is depressed until the proper digit is reached.

(C) The units digit is introduced into the last column. Should the desired digit position be passed inadvertently, the advance switch is merely held to re-reach the number; a carry will not be introduced from one column into the adjacent column.

(3) The range selector switches S–1, S–2 are set so that the known standard voltage will lie within the limits of the selected range.

(4) The range fine adjust resistor R14 is manipulated until a null is achieved as indicated by the null indicator lamps being extinguished.

(5) The zero shift factor may now be established. To do so, the reset switch S–13 (FIGURE 3) is depressed and, with the stepping switches at home and the voltage to be offset applied to the input, the zero shift control adjusted until a null is obtained.

Variations in the digital readout may be made by changing the relationship of the internal reference voltage to the input voltage. For example, if the maximum input voltage level is by range adjustment made to indicate 99.9 rather than its absolute magnitude, smaller values will be indicated in percent. The proper range setting for an unknown input voltage may be determined by rotating the range selector switch S–1, S–2 through its various steps and observing the reversal of the null indicating lamps 122 and 123. As stated previously, the absolute magnitude (greater than or less than the internal reference voltage) will be indicated only when the stepper switches are "off home." Preferably, the number 999 should be introduced into the indicator lamp banks in order to determine which range setting will "span" the unknown voltage. This technique does not require that the operator have a previous knowledge of the order of magnitude of the input voltage, except that it does not exceed the maximum range of the instrument.

It will be understood that the measuring instruments of the invention may be adapted to current, resistance or other measurements or to multi-meter use by making the minor changes in circuitry necessary to reduce these different variables to a small input voltage suitable to the measuring circuit of the instrument. It also is possible to utilize these instruments for performing arithmetic operations such as obtaining the ratio between two external voltages and for addition, subtraction, multiplication and extraction of square roots.

For determining the ratio between two voltages having a common zero reference, one voltage $E_1$ is connected across the two input leads 37 and 38 (FIGURE 3) of the instrument in the usual manner and the other voltage $E_2$ is connected across leads 31 and 32 which normally are connected to the primary reference supply as indicated in FIGURE 3 but are disconnected therefrom for this application. The digital output reading of the instrument now will be $E_2$ divided by $E_1$ times 1000. Since an instrument having only three resistance decades as shown cannot exceed 999, the instrument should be connected so that the value of $E_2$ always will be greater than that of $E_1$. Both $E_1$ and $E_2$ should be less than one volt, input attenuators being used, if necessary, to reduce the voltage to this value.

For performing certain of the many other arithmetic operations possible with the measuring instruments of the invention, it is necessary to modify or add to the instrument input and potentiometer circuits as will now be explained with particular reference to FIGURES 6–8.

FIGURE 6 illustrates an input circuit suitable for either addition or subtraction of two different voltages $E_1$ and $E_2$ which have a common zero reference and may be connected with their signs either the same or reversed, depending on whether the sum or the difference of the two voltages is desired. The measuring instrument input is taken across a resistor R–85 which preferably is very small as compared to resistors R–86 and R–87 across which the two unknown voltages are applied.

The output voltage $E_0$ to the measuring instrument then is given by:

$$E_0 = \frac{R_{85}(E_1 R_{87} + E_2 R_{86})}{R_{86} R_{87} + R_{85} R_{86} + R_{85} R_{87}}$$

and, for $R_{85} \ll R_{86}$ and $R_{87}$, $$E_0 = E_1 \frac{R_{85}}{R_{86}} + E_2 \frac{R_{85}}{R_{87}} = E_1 K_1 + E_2 K_2$$

The values of resistors R–85, R–86 and R–87 preferably are chosen so that the values of $K_1$ and $K_2$, which may be but are not necessarily equal, do not exceed a value of approximately 0.1. Then the maximum change in instrument reading effected by a one-volt change of 100 units (for example, the difference between readings of 876 and 976). This input circuit is particularly useful with relatively high voltages, i.e., those above one volt, and the input impedance for both $E_1$ and $E_2$ may be made as high or as low as desired.

For multiplication of voltages and extraction of square roots, it is necessary to modify the internal circuitry of the measuring instrument so as to include two potentiometer networks as illustrated in FIGURE 7. As indicated by the dotted line in this figure, the stepper switches of each decade of the two networks operate simultaneously, either because both are actuated by a common drive relay or because the drive relays are electrically interconnected for simultaneous operation. The two potentiometer networks may be directly connected together at one side as shown, with a lead to the exterior of the instrument from the point of connection. Separate leads are brought out from the other side of both networks, and from the adjustable contact of network 141. The adjustable contact of the other network, 140, is connected into the voltage unbalance detection and rebalance drive circuit in the usual manner.

To obtain a direct digital reading of the square root of an input voltage $E_1$, this voltage is connected into the instrument in the manner shown in FIGURE 7. If $E_1$ is a voltage between –1 volt and 1 volt the numerical reading of the instrument will be K times the square root of $E_1$. If $E_1$ is a negative voltage this will be indicated by a negative sign. The constant K includes two parameters, one being the ratio of the voltage divider formed by R–89 and the potentiometer networks 140 and 141, and the other a reference voltage supply $E_b$ which may be either the instrument primary reference supply or other convenient voltage source. R–89 should be much larger than the resistance of the potentiometer network 140 to minimize loading of that network; for a one thousand ohm potentiometer network as described above, for example, R–89 preferably is about 400,000 oms. The voltage output of potentiometer network 140 then will be within 0.05% of linearity.

The voltage output of potentiometer 140 is $E_b X$, and the voltage across potentiometer 141 is:

$$\frac{E_b X}{R_{89} + 1000} = \frac{E_1}{X}$$

where X is the instrument reading. Therefore, $$X^2 = \frac{E_1 (R_{89} + 1000)}{E_b}, \text{ and } X \sqrt{E_1 \frac{R_{89} + 1000}{E_b}} = K \sqrt{E_1}$$

where K is a constant.

In a typical case, R–89 and $E_b$ might be chosen so that the value of K is one thousand, in which case the reading of the instrument will be equal to one thousand times the square root of the input voltage $E_1$. Thus, when $E_1$ equals .01 volt, the instrument reading would be 100, and so forth.

FIGURE 8 shows the measuring instrument of FIGURE 7 with its external circuitry modified so that the instrument multiplies two input voltages $E_1$ and $E_2$ and provides an output voltage $E_3$ which is equal to the product of the two input voltages or to such product times a constant. E-1, E-2 and E-3 all must have a common zero reference, and E-3 appears as a D.C. voltage which may be applied to any conventional voltage measuring instrument or to a second digital indicating instrument to thus obtain a digital reading of the multiplied voltage. The voltage source $E_B$ may be any convenient external reference supply or, if desired, the internal reference supply, in which case the digital equivalent of $E_1$ will be presented as a by-product of the multiplication process without requiring any additional measuring instrument. With a measuring instrument of one-volt maximum input as described above, $E_1$ should lie between –1 volt and +1 volt, and $E_2$ should be numerically less than some specified maximum voltage, otherwise suitable attenuator means should be provided.

As will be understood by those skilled in the art, still other modifications may be made in the instrument input and potentiometer circuits to adapt the instrument to other specific applications. It will also be understood that the instrument output indication may be modified to suit the particular control or other function desired in the specific application, and also that it is both possible and practicable to eliminate stepper switches from the potentiometer network of the instrument and instead employ a so-called "relay counting chain" wherein a series of relays open and/or close to select various taps in the potentiometer network, the off-normal and interrupter switches described in the foregoing being suitably connected for operation by and with the relays.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which comes within the meaning and range of equivalency of the claims are therefore intended to be embraced therein.

What is claimed and desired to be secured by United States Letters Patent is:

1. An electrical measuring instrument providing analog-to-digital conversion and digital indication of the measured variable comprising a potentiometer network including a reference voltage source connected across a plurality of banks of series-connected uniform resistors;

adjustable contacts in each resistance bank with the adjustable contacts and resistor banks connected to provide a potentiometer balancing resistance comprising portions of the resistance banks across which said voltage source maintains a reference electromotive force in opposition to an electromotive force to be measured; electrical means responsive to unbalance between said electromotive forces substantially independently of the magnitude of unbalance to energize one or the other of a pair of control circuits dependent on the polarity of unbalance; a plurality of relay mechanism each connected to one of said adjustable contacts and operable when actuated to selectively adjust the position thereof; switch mechanism in said control circuits including means selectively connecting said relay mechanisms into said control circuits in predetermined sequence to be actuated thereby if then energized and to sequentially adjust said adjustable contacts to positions such that the potentiometer network becomes substantially rebalanced, and means indicating the rebalance positions of said adjustable contacts to thus provide a digital indication of the magnitude of the electromotive force measured.

2. The measuring instrument defined in claim 1 wherein said reference voltage source includes range adjust means comprising a plurality of resistor networks selectively connectable in circuit with the voltage supply means to obtain desired reference voltage range, each said resistor network including series and shunt resistors of relative values such that the current flow from said voltage supply means is substantially equal at different reference voltage ranges.

3. The measuring instrument defined in claim 1 including secondary reference supply means connectable in series relation with said reference electromotive force and the electromotive force measured, said secondary reference supply means comprising a voltage source shunted by an adjustable potentiometer and a center-tapped network of two resistors having equal resistance values.

4. An electrical measuring instrument providing analog-to-digital conversion and digital indication of the measured variable comprising a potentiometer network including a reference voltage source connected across a plurality of resistance decades each of different decimal designation; adjustable contacts in each resistance decade with the contacts and resistor decades connected to provide a potentiometer balancing resistance comprising portions of the resistor decades across which said voltage source maintains a reference electromotive force; means for connecting said potentiometer balancing resistance with said reference electromotive force in opposition to an electromotive force to be measured; means detecting unbalance between said electromotive forces, positive and negative control circuits including means responsive to the detected unbalance to energize one or the other of said control circuits dependent on the sign of the unbalance voltage; a plurality of relay mechanisms each connected to the adjustable contacts of one resistance decade and operable when actuated to unidirectionally drive the associated contacts in a direction opposite to the direction of drive of the contacts in the resistance decades of next higher and next lower decimal designation; switch mechanism in said control circuits including means selectively connecting said relay mechanisms into said control circuits in predetermined sequence to be actuated thereby if then energized and to sequentially adjust said adjustable contacts to positions such that the potentiometer network is substantially rebalanced, and means indicating the rebalance positions of said adjustable contacts to thus provide a digital indication of the magnitude of the electromotive force measured.

5. An electrical measuring instrument comprising a potentiometer network including a reference voltage source connected across three resistance decades each of different decimal designation; a relay driven stepper switch in each resistance decade unidirectionally adjustable to place portions of said resistance decade across which said voltage source maintains a reference electromotive force in opposition to an electromotive force to be measured, the stepper switches in the decades of lowest and highest decimal designation being adjustable in directions to increase applied resistance and the decade switch of intermediate designation being adjustable in the opposite direction; means detecting unbalance between said electromotive forces; positive and negative control circuits including means responsive to the detected unbalance to energize one or the other of said control circuits dependent on the sign of the unbalance voltage; means initially causing the stepper switches of the decades of lowest and intermediate decimal designations to assume maximum resistance positions; switch means then connecting the decade switch of highest decimal designation into the positive control circuit and the decade switch of lowest decimal designation into the negative control circuit, switch means then breaking these connections and connecting the intermediate decade switch into the negative control circuit and the lowest decade switch into the positive control circuit, and switch means effective to break the connection of said intermediate decade switch into the negative control circuit with actuation of the lowest decade switch by the positive control circuit whereby when the lowest decade switch steps up past exact balance the resultant change in polarity of the unbalance voltage is not effective to actuate the intermediate decade switch; and means indicating the balance positions of said decade switches.

6. An electrical measuring instrument providing analog-to-digital conversion and digital indication of the measured variable comprising a potentiometer network including a reference voltage source connected across a plurality of resistance decades each of different decimal designation, a relay driven stepper switch in each resistance decade unidirectionally adjustable to place portions of said resistance decade across which said voltage source maintains a reference electromotive force, an input line reversing switch connecting said reference electromotive force in series relation to an electromotive force to be measured, relay means operable when energized to actuate said reversing switch to reverse the connection between said electromotive forces, positive and negative control circuits including means sensitive to unbalance between said electromotive forces to energize one or the other of said circuits dependent on unbalance polarity, switch means momentarily connecting said reversing switch relay means into one of said control circuits for actuation thereby if then energized, holding means effective to hold said reversing switch in reversed position if placed in such position by actuation of its relay, and switch mechanism in said control circuits including means inoperative during said momentary connection and thereafter operative to selectively connect said stepper switch relays into said control circuits in predetermined sequence to be actuated thereby if then energized and to sequentially adjust said decade stepper switches to positions such that the potentiometer network becomes substantially rebalanced.

7. An electrical measuring instrument providing analog-to-digital conversion and digital indication of the measured variable comprising a potentiometer network including a reference voltage source connected across a plurality of resistance decades each of different decimal designation, a relay driven stepper switch in each resistance decade unidirectionally adjustable from a home position to place portions of said resistance decade across which said voltage source maintains a reference electromotive force in opposition to an electromotive force to be measured, positive and negative control circuits including means detecting unbalance between said electromotive forces and energizing one or the other of said control circuits dependent on the sign of the unbalance voltage, a third control circuit constantly energized, and switch mechanism in said positive and negative control circuits including means connecting the stepper switch relays selectively into said third constantly energized circuit and into said positive and negative control circuits in predetermined sequence for actuation thereby if then energized to sequentially adjust the stepper switches to positions such that the potentiometer network becomes substantially rebalanced.

8. An electrical measuring instrument comprising a potentiometer network including a reference voltage source connected across a plurality of resistance decades each of different decimal designation; a relay driven unidirectional stepper switch in each resistance decade with said switches and resistance decades connected to provide a potentiometer balancing resistance comprising portions of the resistance decades across which said voltage source maintains a reference electromotive force in opposition to an electromotive force to be measured; a single pair of thyratrons each having first and second control electrodes and an anode-cathode circuit normally connected into a control circuit whereby each thyratron may energize its respective control circuit when ignited by its control electrodes; means applying a common reference signal of predetermined frequency to the first control electrode of both said thyratrons; means producing two oppositely phased error signals both of said predetermined frequency and one or the other of the error signals being substantially in phase with said reference signal dependent on the sign of the unbalance between said electromotive forces, one of said two error signals being applied to the second control of each of said thyratrons; and switch mechanism in said control circuits including means selectively connecting the driving relays of said decade stepper switches into said control circuits in predetermined sequence to be actuated thereby if then energized and to sequentially adjust said switches to positions such that the potentiometer network becomes substantially rebalanced.

9. The measuring instrument defined in claim 8 including a relay actuated switch operable when energized to connect said thyratrons into said control circuits, means initially energizing said relay actuated switch to place the thyratrons in circuit and permit firing thereof, and means responsive to firing of either thyratron to maintain said relay actuated switch energized so long as either thyratron continues periodically to be fired and to de-energize the relay when both thyratrons remain unfired.

10. Apparatus for indicating the polarity of an error voltage comprising a pair of thyratrons each having first and second control electrodes and an anode-cathode circuit connected into a control circuit whereby each thyratron may energize its respective control circuit when ignited by its control electrodes; an alternating current source of predetermined frequency; an error voltage chopper switch driven by said alternating current source providing an error output alternating current signal at said predetermined frequency; means coupling one of said alternating current signals to the first control electrode of both said thyratrons to apply a common reference signal thereto; means splitting the other of said alternating current signals into oppositely phased signals and applying one of said oppositely phased signals to the second control electrode of each thyratron, one or the other of said oppositely phased signals being substantially in phase with said common reference signal dependent on the polarity of the error voltage; and means limiting the positive signal swing of at least one control electrode of each thyratron whereby only one of the thyratrons is fired by the reference and error signals applied to its control electrodes irrespective of the magnitudes of said signals.

11. In apparatus for indicating the polarity of an error voltage the combination of a pair of thyratrons each having at least one control electrode and a cathode and anode adapted to be connected into a control circuit whereby each thyratron may energize its respective control circuit when ignited by its control electrodes, a relay-actuated switch operative to connect said thyratrons into said control circuits on energization of the switch relay and to disconnect and thus disable the thyratrons on de-energization of the relay, means initially energizing said switch relay to place the thyratrons in circuit and permit gating thereof, and means responsive to firing of either thyratron to maintain said relay energized so long as either thyratron continues periodically to be fired and to de-energize said relay when both thyratrons discontinue firing.

12. The combination defined in claim 11 wherein said means maintaining the switch relay energized includes a capacitor having one side connected to one side of said relay and to the anodes of each of a pair of diodes each having its cathode connected to one of said thyratron anodes, and voltage supply means connected to the sides of said relay and capacitor opposite said one side thereof.

13. An electrical measuring instrument providing analog-to-digital conversion and digital indication of the measured variable comprising a potentiometer network including a voltage source connected across a plurality of banks of series-connected uniform resistors; adjustable connections to each resistance bank with the adjustable connections and resistor banks connected to provide a potentiometer balancing resistance comprising portions of the resistance banks across which said voltage source maintains a reference electromotive force in opposition to an electromotive force to be measured; electrical means responsive to unbalance between said electromotive forces substantially independently of the magnitude of unbalance to energize one or the other of a pair of control circuits dependent on the polarity of unbalance; a plurality of relay mechanisms each connected to one of said adjustable connections and operable when actuated to selectively adjust the condition thereof; switch mechanism in said control circuits including means selectively connecting said relay mechanisms into said control circuits in predetermined sequence to be actuated thereby if then energized and to sequentially adjust said adjustable connections to conditions such that the potentiometer network becomes substantially rebalanced, and means indicating the rebalance condition of said adjustable connections, to thus provide a digital indication of the electromotive force measured.

14. An electrical measuring instrument providing analog-to-digital conversion and digital indication of the measured variable comprising a potentiometer network including a voltage source connected across a plurality of resistance decades each of different decimal designation; adjustable connections to each resistance decade with the connections and resistance decades coupled to provide a potentiometer balancing resistance comprising portions of the resistance decades across which said voltage source maintains a reference electromotive force; means for connecting said potentiometer balancing resistance with said reference electromotive force in opposition to an electromotive force to be measured; means detecting unbalance between said electromotive force, positive and negative control circuits including means responsive to the detected unbalance to energize one or the other of said control circuits dependent on the sign of the unbalance voltage; a plurality of relay mechanisms affixed to the adjustable connections of one resistance decade and operable when actuated to condition the associated connections in an opposite condition to the condition of the connections in the resistance decades of next higher and next lower decimal designation; switch mechanisms in said control circuits including means selectively connecting said relay mechanisms into said control circuits in predetermined sequence to be actuated thereby if then energized and to sequentially adjust said adjustable connection to conditions such that the potentiometer network is substantially rebalanced, and means indicating the rebalance conditions of said adjustable connections to thus provide a digital indication of the electromotive force measured.

15. An electrical measuring instrument comprising a potentiometer network including a voltage source connected across three resistance decades each of different decimal designation; a relay driven stepper switch in each resistance decade unidirectionally adjustable to place portions of said resistance decade across which said voltage source maintains a reference electromotive force in opposition to an electromotive force to be measured, the stepper switches in the decades of lowest and highest decimal designation being adjustable in directions to increase applied resistance and the decade switch of intermediate designation being adjustable in the opposite direction; means detecting unbalance between said electromotive forces; positive and negative control circuits including means responsive to the detected unbalance to energize one or the other of said control circuits dependent on the sign of the unbalance voltage; means initially causing the stepper switches of the decades of lowest and intermediate decimal designations to assume maximum resistance positions; switch means then connecting the decade switch of highest decimal designation into the positive control circuit and the decade switch of lowest decimal designation into the negative control circuit, switch means then breaking these connections and connecting the intermediate decade switch into the negative control circuit and the lowest decade switch into the positive control circuit, and switch means effective to break the connection of said intermediate decade switch into the negative control circuit with actuation of the lowest decade switch by the positive control circuit whereby when the lowest decade switch steps up past exact balance the resultant change in polarity of the unbalance voltage is not effective to actuate the intermediate decade switch; and means indicating the balance positions of said decade switches.

16. An electrical measuring instrument providing analog-to-digital conversion and digital indication of the measured variable comprising a potentiometer network including a reference voltage source connected across at least three resistance decades each of different decimal designation unidirectionally adjustable in reverse directions, a relay driven stepper switch in each resistance decade unidirectionally adjustable from a home position to place portions of said resistance decades across which said voltage source maintains a reference electromotive force in opposition to an electromotive force to be measured, the stepper switch of each decade when in home position connects a minimum portion of said decade in said potentiometer balancing resistance, positive and negative control circuits including means detecting unbalance between said electromotive forces and energizing one or the other of said control circuits dependent on the sign of the unbalance voltage, a third control circuit constantly energized, and switch mechanism in said positive and negative control circuits including means connecting the stepper switch relays selectively into said third constantly energized circuit and into said positive and negative control circuits, said switch mechanism on actuation first placing the stepper switches of all decades but that of highest decimal designation in maximum resistance position by connecting certain of the stepper switch relays into said constantly energized control circuit, then selectively connecting said stepper switch relays into said positive and negative control circuits in predetermined sequence for actuation thereby if then energized to sequentially adjust the stepper switches to balance positions.

17. An electrical measuring instrument providing analog-to-digital conversion and digital indication of the measured variable comprising a potentiometer network including a reference voltage source connected across a plurality of resistance decades each of different decimal designation, a relay driven stepper switch in each resistance decade unidirectionally adjustable from a home position to place portions of said resistance decade across which said voltage source maintains a reference electromotive force in opposition to an electromotive force to be measured, positive and negative control circuits including means detecting unbalance between said electromotive forces and energizing one or the other of said control circuits dependent on the sign of the unbalance voltage, a third control circuit constantly energized, switch mechanism in said positive and negative control circuits including means connecting the stepper switch relays selectively into said third constantly energized circuit and into said positive and negative control circuits in predetermined sequence for actuation thereby if then energized to sequentially adjust the stepper switches to positions such that the potentiometer network becomes substantially rebalanced, interrupter switch contacts actuated by said stepper switch drive relays on energization thereof, and a reset circuit including said interrupter contacts operative when energized to self-cycle said stepper switches to home positions.

18. The measuring instrument defined in claim 17 including off-home switches actuated by each of said stepper switches and having open contacts at stepper switch home positions; said off-home switch contacts being connected into said reset circuit whereby self-cycling of the stepper switches drive relays ceases when the stepper switches reach home positions.

References Cited in the file of this patent
UNITED STATES PATENTS

| | | |
|---|---|---|
| 2,497,961 | Shaw | Feb. 21, 1950 |
| 2,508,424 | Rouy | May 23, 1950 |
| 2,550,030 | Wild | Apr. 24, 1951 |
| 2,625,822 | Nichols | Jan. 20, 1953 |
| 2,775,754 | Sink | Dec. 25, 1956 |
| 2,784,369 | Fenemore et al. | Mar. 5, 1957 |

FOREIGN PATENTS

| | | |
|---|---|---|
| 136,460 | Australia | Dec. 12, 1946 |
| 623,679 | Great Britain | May 17, 1949 |